April 4, 1950 R. P. BREESE 2,503,026
TRANSMISSION OPERATING MECHANISM
Original Filed July 2, 1941 5 Sheets-Sheet 1

INVENTOR
ROBERT P. BREESE
BY
ATTORNEY

April 4, 1950 R. P. BREESE 2,503,026
TRANSMISSION OPERATING MECHANISM
Original Filed July 2, 1941 5 Sheets-Sheet 3
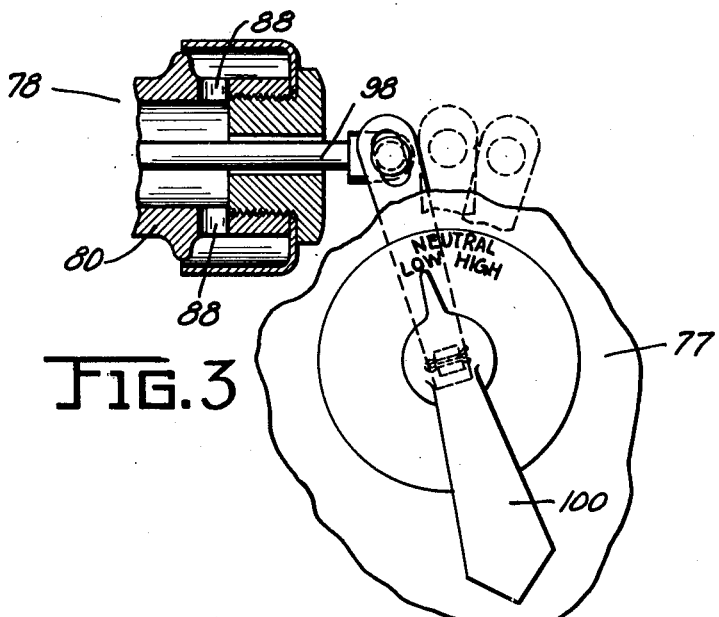
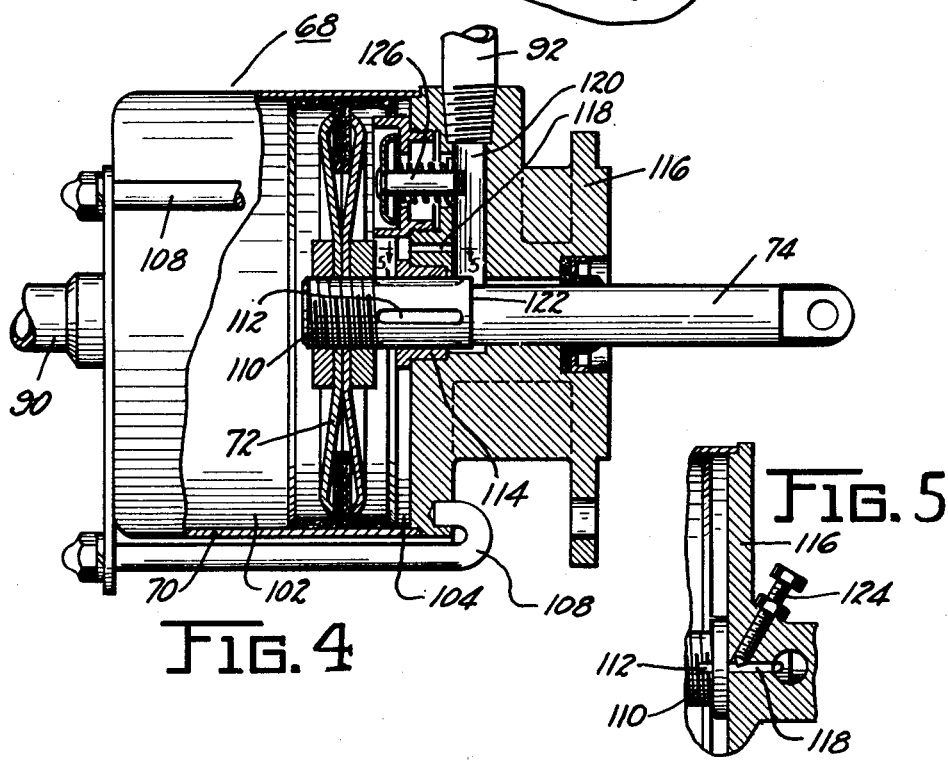
INVENTOR
ROBERT P. BREESE
BY
H. O. Clayton
ATTORNEY

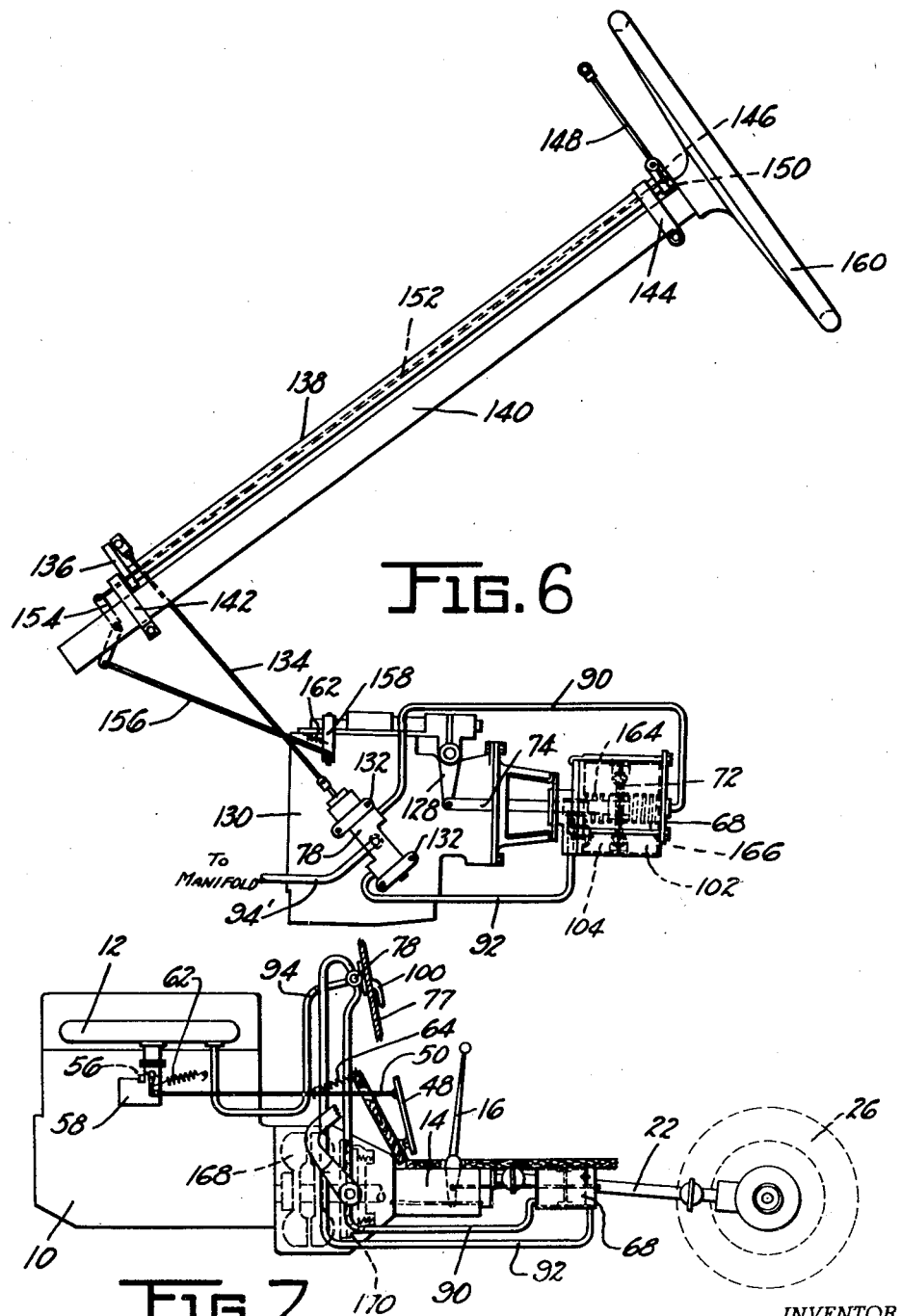

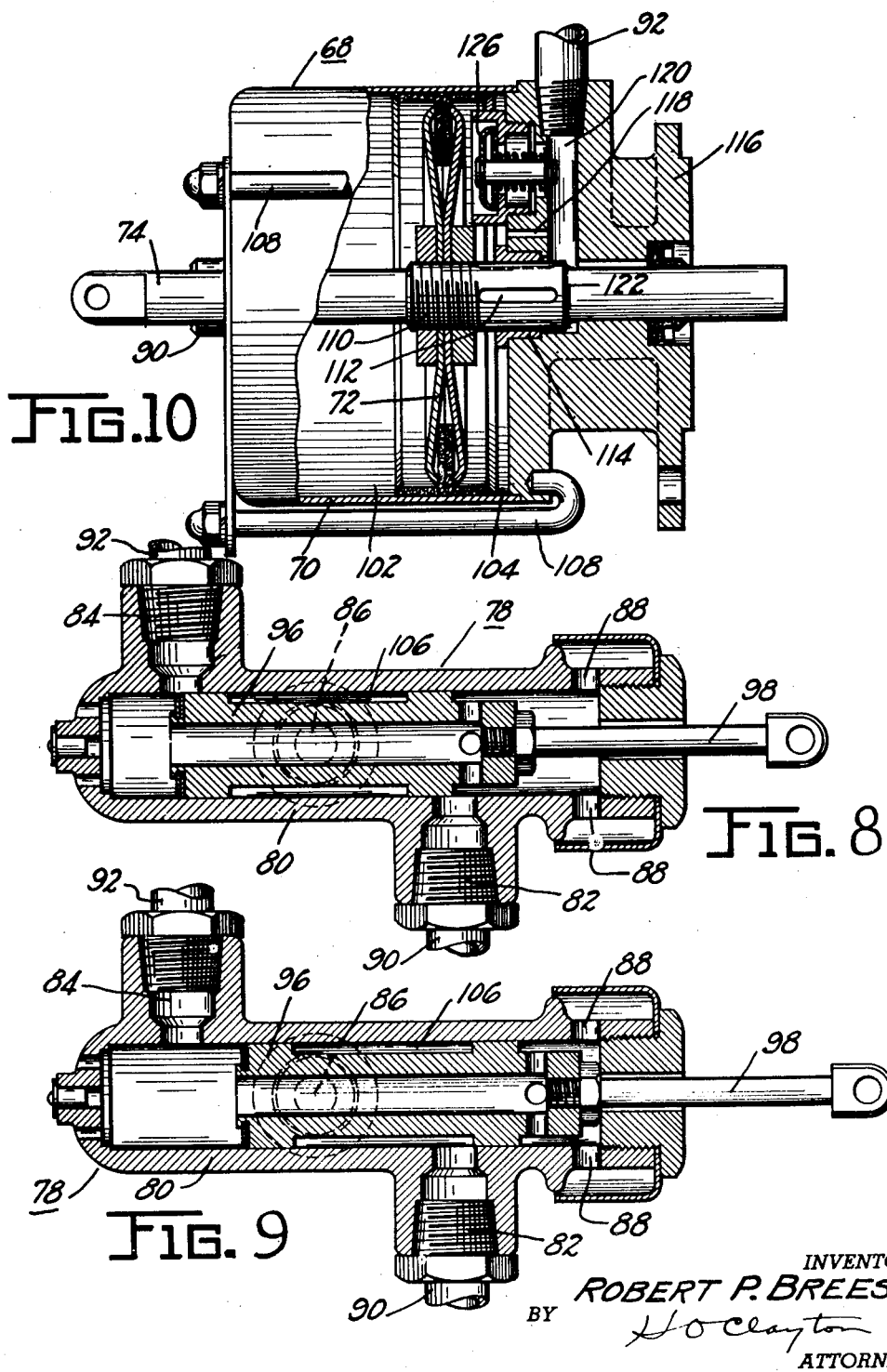

Patented Apr. 4, 1950

2,503,026

UNITED STATES PATENT OFFICE 2,503,026

TRANSMISSION OPERATING MECHANISM

Robert P. Breese, New York, N. Y., assignor, by mesne assignments, to Bendix Aviation Corporation, South Bend, Ind., a corporation of Delaware Continuation of application Serial No. 400,719, July 2, 1941. This application October 26, 1944, Serial No. 560,432

2 Claims. (Cl. 74—472)

This invention in its broadest aspect relates to new and useful improvements in the power plant of an automotive vehicle.

More specifically, the invention relates to gear shifting mechanism and is of particular utility when employed in connection with speed-changing and direction-reversing transmissions including a synchronizing mechanism, commonly used in coupling internal combustion engines of automobiles with the driving vehicle wheels or other propelling devices.

One object of the invention is to provide power operated means for operating a two-speed transmission mechanism, which may be mounted on the differential housing of an automotive vehicle or mounted within said housing and constituting a part of the differential and rear axle construction. Such a mechanism is designed to supplement the conventional change-speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

Such a mechanism provides a more efficient power plant, both in climbing hills and on level ground, there being a quiet performance of the motor at high vehicle speeds, and accordingly less wear and tear on the motor parts. On the boulevard or in the country with the car moving at, say twenty to sixty miles per hour, the two-speed transmission may be operated to select its high ratio; thereupon the car continues at the same speed and the motor speed drops, say one-third of its former speed. There is thus provided what is known as an overdrive mechanism that insures a minimum of noise and vibration, saves wear and tear on moving parts, and in general prolongs the life not only of the motor but of the entire automobile.

A further and important object of the invention is to provide a power mechanism for operating a change-speed transmission, whereby a gear setting is effected in at least two different stages of operation, that is two different rates of movement of the gear to be meshed or the means for coupling the driving gear with the driven gear. Such an operation simulates a conventional manual operation of the gear shift lever, wherein said lever is first moved relatively fast to effect a disengagement of the previously operating meshed gears. This relatively fast movement of the shift lever is continued until the gears to be meshed just contact one with another, the driver sensing this contact: thereupon the driver appreciably reduces the force exerted upon the lever as he feels the gears into mesh, and the instant after said gears are in mesh the engagement is completed at a relatively fast rate of movement. If the transmission is equipped with a synchronizer mechanism the driver reduces the force exerted upon the lever when this mechanism begins to function. Thus by using the power mechanism of my invention the shift lever is moved at at least two different rates of movement in effecting the desired meshing of gears. Such a mechanism is of particular utility in effecting a slight wait or lag in shifting the transmission of the two-speed rear axle from its high to its low gear position, thus enabling a proper synchronization of the speed of the engine with the speed of the vehicle, and when the multi-stage shifter mechanism of my invention is applied to a three-speeds forward and reverse transmission, the delayed action facilitates the operation of the synchronizer mechanism and regardless of the construction the transmission operates to effect a quiet and effective meshing of the gears.

According to one desirable construction the power means includes a pressure differential operated motor having a power element connected to a shift lever, said lever extending from the casing of the transmission. A variable or multi-stage movement of the power element in one direction is effected solely by the mode of operation of the butterfly valve of the carburetor and to effect this variable movement of the power element in its other direction of movement, there is employed a valve mechanism housed within the motor.

A further object of my invention is to provide an automotive power plant including a fluid clutch, change-speed transmission mechanism, manually operated means for controlling a part of said transmission, a manually operated friction clutch interposed between the transmission and fluid clutch and power means, including a multi-stage shifter motor, for operating at least a portion of the transmission mechanism.

Other objects of the invention and desirable details of construction and combination of parts will become apparent from the following description of a preferred embodiment, which description is taken in conjunction with the accompanying drawings, in which:

Figure 3 is a view disclosing the manually operable index means for operating the selector valve of Figure 2;

Figure 4 is an enlarged sectional view of one embodiment of the multi-stage pressure differential operated motor of the power mechanism of my invention;

Figure 5 is a partial sectional view of the motor mechnism of Figure 4, taken on the line 5—5 thereof;

Figure 6 is a view disclosing my multi-stage transmission operating motor connected to the shift rail operating crank of a three-speeds forward and reverse transmission and further disclosing manually operated means for selecting a shift rail to be operated;

Figure 7 is a view disclosing the combination, in the power plant of an automotive vehicle, of an internal combustion engine, a manually operated friction clutch, a fluid clutch and a manually and power operated three-speeds forward and reverse transmission, the power means including the multi-stage motor of my invention;

Figure 8 is a view, similar to Figure 2, disclosing the selector valve in its transmission neutral position;

Figure 9 is a view, similar to Figure 2, disclosing the selector valve in another one of its operative positions; and Figure 10 is a view disclosing the multi-stage transmission operating motor of Figure 4 slightly modified by extending the connecting rod through the left end of the motor.

Figure 1:
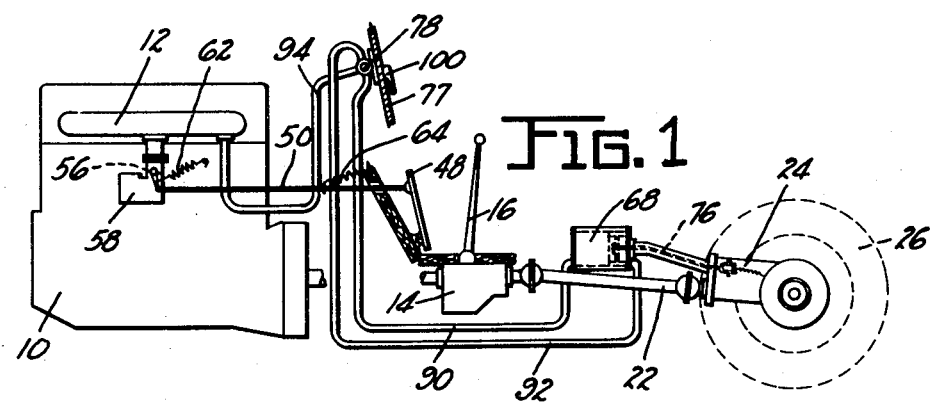
Figure 1 is a diagrammatic view of one embodiment of the transmission operating mechanism constituting my invention.

Referring to the modification of the invention of Figure 1 of the drawings, there are diagrammatically disclosed certain of the elements of the vehicle power plant, including an internal combustion engine 10 having an intake manifold 12, a conventional three-speeds forward and reverse transmission 14 operable by a gear shift lever 16, a propeller shaft 22, and a conventional two-speed rear axle or dual-ratio change-speed transmission mechanism 24 interconnecting the propeller shaft and rear wheels 26.

The important feature of the instant invention resides in the power means for operating a change-speed transmission constituting a part of the power plant of the vehicle. This power operated transmission may be located anywhere in said power plant between the internal combustion engine and the drive wheels of the vehicle. Referring to Figure 4 of the drawings, there is disclosed a double-ended pressure differential operated motor 68 comprising a casing 70 and a piston or power element 72, the latter being operably connected to the aforementioned two-speed transmission mechanism 24 by means of a connecting rod 74 and a Bowden control 76. The transmission mechanism 24 cooperates with the aforementioned three-speeds forward and reverse transmission 14 to in part control the speed of the vehicle. As disclosed in Figure 7 the rod 74 of the motor of Figure 10 might be connected to the lever 16, or other equivalent mechanism, for operating the transmission 14 which constitutes a part of the power plant of many of the automotive vehicles of the day.

Figure 2:
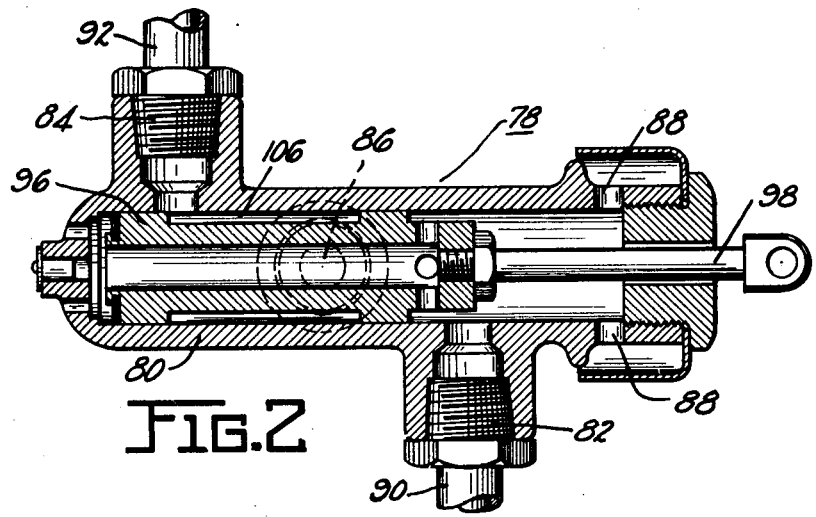
Figure 2 is a sectional view of the double three-way selector valve for in part controlling the transmission operating power means of the mechanism of Figure 1.

The energization and deenergization of the motor 68 to operate either one of the aforementioned transmissions may be controlled by a double three-way that is four-way selector valve 78, detailed in Figures 2, 8 and 9. The latter valve makes unnecessary two separate three-way valve units, each of said units to control the gaseous pressure within one of the two compartments of the aforementioned double-ended motor 68. By means of the double three-way valve described in detail hereinafter, a single valve connects one compartment of the motor to the source of vacuum and the other compartment to the atmosphere to thereby energize the motor to effect one operation of the transmission and then reverses said connections to again energize the motor to effect another operation of the transmission.

The four-way valve 78 comprises a tubular casing 80 ported at 82, 84, 86 and 88 to provide connections respectively with a conduit 90 leading to one end of the motor casing 70, a conduit 92 leading to the other end of the casing 70, a conduit 94 leading to the intake manifold and with the atmosphere. A tubular valve member 96 reciprocably mounted within the tubular valve casing 80 is selectively operated, through the intermediary of a link 98, by a manually operated selector member 100, Figure 3, preferably conveniently mounted in the instrument panel 77 of the vehicle.

Describing now the operation of the transmission operating mechanism disclosed in Figure 1, with the engine idling and the accelerator released a source of vacuum is provided to energize the transmission operating motor 68. The operator may now move the selector valve 78 to the low gear position of Figure 2, thereby interconnecting a compartment 102 of the motor with the atmosphere via conduit 90 and valve ports 82 and 88 and interconnecting a compartment 104 of the motor with the intake manifold via conduit 94, valve port 86, a recess 106 in the valve plunger 96, valve port 84 and conduit 92. The motor 68 is thus energized, the piston 72 moving, at a plurality of rates, to the position disclosed in Figure 4 to establish a low gear ratio setting of the transmission mechanism 24. The construction of the motor for effecting this variable motion of the piston will be described in detail hereinafter. In addition to the operation of the transmission just described, the three-speeds forward and reverse change-speed transmission 14 may be manually operated to place the same in low gear.

The accelerator is now depressed to speed up the engine and the clutch is engaged to get the vehicle under way. Subsequent conventional operations of the transmission 14 will then step up the speed of the vehicle as desired.

When the vehicle is under way at cruising speeds upon level ground, it is desirable that the speed of the engine be dropped without decreasing the speed of the vehicle. To this end the selector 100 is moved to its high gear position, Figure 3, whereupon the motor 68 is again energized, to effect the high gear setting of the transmission mechanism 24. The selector valve 78 is at this time in the position disclosed in Figure 9 and when the selector is in said position the compartment 104 is vented to the atmosphere via the port 84 and conduit 92 and the compartment 102 is connected to the intake manifold by conduit 90. A check valve 126 mounted in the end wall 116 of the motor 68 automatically opens when the piston 72 is moving to the left, to thereby complete the connection between the compartment 104 and the atmosphere.

If, when driving the vehicle, hilly country is encountered or if the driver desires to quickly pass a vehicle, then the transmission 24 may be shifted back to its low gear setting. To facilitate this operation, it is desirable to delay the meshing of the gears of the transmission until the driving gear has been speeded up, for it is to be remembered that when the vehicle is traveling in high gear, the speed of the driven gear of the transmission which is connected to the rear wheels, is appreciably higher than the driving gear connected to the engine.

Reference will now be had to one of the most important features of my invention, namely the multi-stage transmission operating mechanism, which mechanism facilitates the shift of the transmission from high to low gear by effecting the aforementioned delayed action in meshing the gears. As disclosed in Figure 4, the multi-stage motor comprises the double ended casing 70, the ends thereof being secured together by bolts 108. The piston member 72 is operably connected to the transmission 24 by the rod 74, an end portion 110 of said rod being provided with a plurality of annularly spaced grooves 112 adapted to cooperate, in a manner to be described hereinafter, with a bushing 114 in an enlarged end member 16 of the motor.

Describing the multi-stage operation of the mechanism of Figure 4, upon moving the valve member 78 to the low gear position of Figure 2, the right compartment 104 of the motor 68 is connected to the intake manifold via conduit 92, recess 106 in the valve plunger 96, and conduits 94, 34 and 32. The left compartment 102 of the motor is vented to the atmosphere via ports 82 and 88 in the valve casing and conduit 90. The differential of pressures acting on the piston 72 then serves to move the same to the right, to the position disclosed in Figure 4, to establish the low gear selection of the transmission. The first increment or stage of movement of the piston 72 is relatively fast by virtue of the relatively rapid egress of air from the compartment 104 via the space between the small diametered portion of the rod 74 and the bushing 114 and also via a bleed port 118 in the end member 116, a duct 120 in said member, and conduit 92 connected with the manifold. During this period of time, that is when the air is being drawn from the compartment 104 at a relatively rapid rate, the gaseous pressure within said compartment is relatively low and this results in the piston 72 being subjected to a relatively large force; and such a force results in a relatively fast movement of the piston.

When the piston 72 has completed its first stage of movement, that it has moved sufficiently to just bring the gears into contact one with another or to initiate an operation of a synchronizing mechanism if the transmission is so equipped, then at that time the tip end of a land portion 122 of the hub member 110 lies within the bushing 114. Piston 72 may continue to move slightly if there is any yielding movement of the parts of the mechanism connected to the piston; however, this second stage of movement is at a relatively slow rate. During this movement the synchronizer mechanism is functioning to increase the speed of the driving gear of the transmission and the parts interconnecting said gear with the driven element of the friction clutch which is at this time probably disengaged from the driving element of said clutch. This relatively slow movement of the piston 72 is effected by virtue of the relatively slow egress of air from the compartment 104 via the sole means of escape, namely the bleed port 118, duct 120 and conduit 92. If desired, a needle valve member 124, Figure 6, may be adjustably mounted in the member 116 to vary the size of the bleed port 118 and thus predetermine the rate of movement of the piston during its second or slow stage of movement; and this needle valve together with the port 118 constitute what may be termed a second stage valve mechanism. The motor piston 72 is, by virtue of the operation of the second stage valve mechanism 118, 124 subjected to a load which is appreciably less than the load to which it is subjected when the small diameter portion of the link 74 is passing through the bushing 114.

The movement of the piston will probably be momentarily stopped or arrested owing to the abutment of the gear teeth or to an operation of the synchronizer mechanism if the transmission is equipped with such a mechanism; and during this period of time the piston is immobile and the driving gear of the transmission is being speeded up, the continued egress of air from the compartment 104 results in a progressively increasing force exerted by the piston. It is important to note, however, that this force is increased at a relatively slow rate by virtue of the fact that the bleed port 118 provides a relatively small orifice for the air to escape from the compartment 104; accordingly, the rate of egress of air is appreciably reduced. This reduction in the rate of egress of air from the compartment 104 and the resultant low rate of increase in the force exerted by the piston 72 constitutes one of the important features of my invention, for if the land portion 122 were not provided, then the rate of egress of air via the grooves 112 and the resultant rate of increase of force exerted by the piston would be relatively high. This would result in the building up of a relatively large force which would slam the gears into mesh and this, of course, is undesirable. When the land portion 122 has moved to the right sufficiently far to register the grooves 112 with the duct 120, all as disclosed in Figure 4, then the rate of egress of air from compartment 104 is increased and this results in an increase in the rate of movement of the piston 72 during the last part of its movement.

As described above, the mechanism is so constructed that the relatively slow movement of the piston 72 is initiated when the synchronizing operation of the driving and driven elements of the transmission is initiated; and the aforementioned relatively fast movement of the piston is resumed immediately after the synchronizing operation is completed. If the transmission is not provided with a synchronizer, then this relatively fast movement is resumed when the abutting gears to be meshed reach the same speed and the meshing operation is initiated.

There is thus provided three different and distinct rates of movement of the piston 72 to effectively simulate a skillful and efficient manual operation of the transmission 24.

If the transmission operating means includes a manually operated lever mounted beneath the steering wheel as is used in most of the present-day passenger cars, then the connecting rod 74 extending from the motor 68 is pivotally connected to a shift rail operating crank 128 extending from the casing 130 of the transmission. Describing this construction, which is disclosed in Figure 6, the previously described selector valve 78 is secured to the transmission casing by brackets 132. This valve is actuated by linkage including a rod 134, a crank 136 secured to a tubular member 138, said member being secured to the steering column 140 of the vehicle by brackets 142 and 144. To the upper end of the member 138 there is secured a member 146 to which is pivoted a manually operated selector lever 148. For purposes of illustration this lever is, in Figure 6, shown 90° out of its true position. To the lower end of the selector lever there is pivotally connected at 150 a rod 152 housed within the tubular member 138 and to the lower end of the rod 152 there is pivotally connected a bell crank lever 154 pivotally secured to the steering column. A link 156 interconnects the bell crank lever with a crank 158 operably connected to shift rail selecting mechanism of the transmission.

Describing the operation of the transmission operating mechanism disclosed in Figure 6, after the accelerator is released and the conventional manually operated friction clutch, not shown, is disengaged, the selector lever 148 is lifted upwardly toward the steering wheel 160. This operation serves to rotate the crank 158 counterclockwise against the tension of a spring 162 which spring biases the crank to a position to effect a selection of the second and high gear shift rail of the transmission. This counterclockwise rotation of the crank 158 and the shift rail selecting mechanism connected thereto serves to effect a selection of the low and reverse gear shift rail. The selector lever 148 is then rotated clockwise in a plane parallel to the plane of the steering wheel 160 and toward its low gear position and this operation serves to move the valve plunger 96 of the selector valve 78 to the position disclosed in Figure 2. The compartments 104 and 102 of the motor 68 are thus connected respectively to the intake manifold and the atmosphere and the subsequent energization of the motor places the transmission in low gear. In this operation of the motor the piston 78 moves to the left, Figure 6, at a variable rate of speed, all as previously described.

The transmission having been established in low gear the driver then engages the clutch and opens the throttle to get the vehicle under way. When a shift to second gear is desired the throttle is again closed and the clutch is again disengaged. The selector lever 148 may then be rotated counterclockwise to move the valve 78 to its transmission neutral position disclosed in Figure 8. When the valve reaches this position the motor 68 is deenergized as previously described, whereupon a spring 164, interposed between the piston 72 and one end wall of the motor, functions to move the piston and the crank 128 connected thereto to their transmission neutral positions. This spring is, of course, compressed when the piston 72 is moved to its low gear position. A spring 166 is provided to neutralize the transmission when the selector lever is moved to its transmission neutral position from either its second or reverse gear position. Now, when the crank 128 and the low and reverse gear shift rail connected thereto are placed in their transmission neutral positions the spring 162 automatically operates to move the crank 158 clockwise, thereby operating the shift rail selecting mechanism within the transmission to select the second and high shift rail and when the crank 158 is rotated clockwise the selector lever 148 is also rotated clockwise in a plane normal to the plane of the steering wheel.

The driver then rotates the selector lever 148 counterclockwise to its second gear position, the valve member 96 being moved to the position disclosed in Figure 9. The motor 68 is then again energized to place the transmission in second gear, the compartments 104 and 102 of the motor being connected respectively to the atmosphere and source of vacuum. The check valve 126 automatically opens to admit atmosphere to the compartment 104, thereby insuring a uniform rate of movement of the piston 72. To effect this uniform movement the throttle must remain closed to maintain a constant or substantially constant vacuum in the intake manifold. However, as described hereinafter, the movement of the piston is a variable one if the opening of the throttle is properly timed with the operation of the motor 68. The reverse and high gear operations of the power means of Figure 6 need not be described inasmuch as these operations will be apparent from the detailed description of the previously described low and second gear operations of said means. However, an important feature of my invention lies in the aforementioned means for effecting a multi-stage movement of the piston 72 and the second and high gear shift rail connected thereto, when the transmission is being established in second gear.

Describing this operation, the throttle or so-called butterfly valve 56 may be so operated as to control the gaseous pressure or degree of vacuum within the intake manifold, thereby providing means for effecting a reduction of the differential of pressures acting upon the piston 72 after the operation of the synchronizer of the transmission is initiated. This operation of the synchronizer, as previously described, appreciably slows up or completely arrests the movement of the piston if the linkage does not yield or bend slightly. To effect this reduction in the differential of pressures acting upon the piston 78 the driver reopens the throttle valve 56 by depressing the accelerator and this operation decreases the vacuum, that is increases the gaseous pressure within the intake manifold and the compartment 102 of the motor connected thereto. This increase in gaseous pressure serves to reduce the load on the piston 78 when the synchronizer is operating and also effects a relatively slow movement of the piston when the gears are being moved into mesh after the operation of the synchronizer has been completed. It is only necessary to open the throttle slightly to effect this drop in manifold vacuum and this is done just before the clutch plates contact as the clutch is being engaged.

There is thus provided in the throttle valve 56 means, cooperating with the check valve 126 in the motor 68, for effecting a two-stage operation of said motor in the operation of placing the transmission in second gear. In the transmission operating mechanism of Figure 6 the port 86 of the selector valve 78 is directly connected with the intake manifold by a conduit 94'.

As disclosed in Figure 7 the vehicle may be equipped with a conventional type of fluid clutch that is fluid coupling 168 in addition to a manually operated friction clutch 170. With this mechanism incorporated in the power plant of the vehicle, it will not, with the transmission established in either second or high gear and the vehicle in motion, be necessary to disengage the friction clutch or manually operate the shift lever 16, for once said lever is manually operated to place the transmission in first gear then the subsequent second and high gear operations of the transmission are effected by the power means. If under unusual driving conditions the car is started in low gear by virtue of a manual operation of the friction clutch and shift lever, then the subsequent operations of the transmission, that is alternately placing the same in second and then in high gear, will be effected by the power means including the motor 68 and the aforementioned spring for biasing the shift lever 16 to the right, all as previously described. It is also to be noted that the multi-stage operation of the motor 68, when changing the setting of the transmission from either high or low gear to second gear, insures a quiet and smooth meshing of the gears; and the motor when so operating cooperates with the then operating fluid coupling to effect this smooth meshing of the gear.

The slowing down of the motor piston that is second stage movement thereof is particularly necessary when the car is equipped with a fluid clutch and the friction clutch is not disengaged prior to effecting a shift to second gear, for despite the closing of the throttle to reduce, that is to reverse, the driving torque, the fluid clutch will transmit power to the driving gear of the transmission. Accordingly, the meshing of the driving and driven gears to establish the transmission in second gear is facilitated by slowing down the movement of the motor piston just prior to a meshing of said gears. As previously described during this slowing down period, that is during the time the load exerted by the piston is reduced, the synchronizing operation of the transmission is being effected. The driver of the vehicle may, with the mechanism disclosed in Figure 7, open the throttle slightly to reduce the manifold vacuum and thereby facilitate a meshing of the gears to establish the transmission in high gear. This operation is set forth above in describing the operation of the mechanism disclosed in Figure 6.

Reviewing the operation of the transmission operating mechanism disclosed in Figure 1, if the vehicle is at a standstill, the engine is idling, the clutch is disengaged, and the manually operated transmission 14 is placed in, say, second gear, then a shift of the transmission 24 may be made to low gear simply by moving the selector 100 to its low gear position. The motor 68 is then energized to effect the previously described multi-stage movement of the piston 78 to establish the two-speed rear axle transmission 24 in low gear. The clutch is then engaged as the accelerator is depressed and the vehicle gets under way. The transmission 14 may then be placed in high gear. After the desired speed of the vehicle is reached the driver will probably desire to establish the transmission 24 in high gear, or ofttimes called overdrive, whereupon he first releases the accelerator, then disengages the clutch and then moves the selector 100 to its high gear or overdrive setting. The motor 68 is then energized, as described above, and the transmission is quickly established in high gear. The reversal of the engine torque, resulting from the release of the accelerator, facilitates this operation, particularly the operation of demeshing the gears which establish the transmission in low gear. This high gear operation of the motor 68 is also facilitated by a speeding up of the engine after the demeshing of the gears has been completed; for as described above, when the throttle valve is opened to speed up the engine the gaseous pressure within the compartment 102 of the motor 68 is varied in accordance with the operation of the throttle valve which in turn varies the gaseous pressure within the intake manifold and the aforementioned motor compartment 102 directly connected thereto.

Now, when the speed of the vehicle is decreased to an amount making it desirable to shift the transmission 24 back to low gear or ofttimes called underdrive, the clutch is disengaged and the accelerator is released, thereby bringing the internal combustion engine down to its idling speed. This results in a reversal of the driving torque, referred to above, thereby facilitating a demeshing of the gears of the transmission which establish the same in high gear. The selector 100 is then moved to its low gear position, whereupon the motor 68 is again energized to establish the transmission 24 in low gear; and this operation of the motor is facilitated by speeding up the engine. Explaining this operation, when the accelerator is depressed, which should be done after the first stage operation of the piston 72 has been completed, the resulting increase in gaseous pressure within the intake manifold and compartment 104 connected thereto together with the operation of the second stage valve mechanism and the increase in speed of the driving elements of the transmission combine to effect a smooth and quiet meshing of the gears to establish the transmission in low gear.

There is thus provided in the transmission operating mechanism of my invention power means for establishing the desired gear setting of either the three-speeds forward and reverse selective gear transmission 14 or the two-speed rear axle 24 or equivalent selective gear transmission. The power mechanism includes a double-acting motor having a power element movable at a variable rate of speed in both directions in the embodiments disclosed in Figures 1, 6 and 7. The motor cooperates with the driving and driven gears of the transmission and with the throttle and the clutch mechanism of the vehicle to effect a quiet meshing of said gears. The mechanism includes but a minimum of controls including the accelerator and a simple hand operated selector valve which may be conveniently mounted in the instrument panel of the driver's compartment. The friction clutch of the vehicle is operated in effecting the operation of the transmission; however, in shifting the two-speed rear axle transmission 24, Figure 1, this operation may be, and preferably is, effected without disengaging said clutch. And, as described supra, if the vehicle is equipped with a fluid clutch the friction clutch need not be operated.

The major portion of the above described mechanism was disclosed in my application Serial No. 145,216, filed May 28, 1937, which resulted in Patent No. 2,275,944, issued March 10, 1942. The instant application is a continuation of my application Serial No. 400,719 filed July 2, 1941, now abandoned, the latter application being a continuation-in-part of my application 145,216. Application Serial No. 145,216 constituted a division of the application which resulted in my Patent No. 2,179,710, dated November 14, 1939.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a change-speed transmission, an intake manifold and a carburetor controlled by a throttle valve, power means for operating the transmission comprising a double-ended double-acting pressure differential operated motor having its power element operably connected to the transmission, a manually operated selector valve movable to two different positions to control the operation of said motor, fluid transmitting means interconnecting said valve and motor, a fluid transmitting conduit interconnecting the intake manifold and selector valve and other valve means positioned within the motor on one side of said power element and operative to control the gaseous pressure within one compartment of said motor, said latter valve means cooperating with said throttle valve and selector valve to control the operation of said motor, the parts of the aforementioned mechanism being so constructed and arranged as to automatically effect a multi-stage movement of said power element in one direction when, with the engine operating, the selector valve is moved to one of its positions and the throttle valve is first closed and then opened, and, by closing the throttle and operating the selector valve, to effect a multi-stage movement of said power element in the other direction solely by the operation of the valve mechanism within the motor.

2. In an automotive vehicle provided with an internal combustion engine having an intake manifold, a carburetor controlled by a throttle valve, an accelerator, non-yieldable means interconnecting the throttle valve and accelerator whereby the valve is operated with any movement of the accelerator and an overdrive change-speed transmission for effecting a decrease in the speed of the engine while maintaining the speed of the vehicle, power means for operating the transmission comprising a double-ended, double-acting pressure differential operated motor having its power element operably connected to the transmission, a manually operated selector valve movable to two different positions to control the operation of said motor, fluid transmitting conduits interconnecting said valve and motor, a fluid transmitting conduit interconnecting the the intake manifold and selector valve and other valve means positioned within the motor on one side of said power element and operative to control the gaseous pressure within one compartment of said motor, said latter valve means cooperating with said throttle valve and selector valve to control the operation of said motor the parts of the aforementioned mechanism being so constructed and arranged as to automatically effect a multi-stage movement of said power element to establish the transmission in its overdrive or high gear setting when, with the engine operating, the selector valve is moved to one of its positions and the throttle is closed and then opened, and, by closing the throttle and operating the selector valve, to effect a multi-stage movement of said power element to establish the transmission in its underdrive or low gear setting solely by the operation of the valve mechanism within the motor, said latter operation of the motor being facilitated by an opening of the throttle during the second stage of movement of the power element.

ROBERT P. BREESE.

REFERENCES CITED

The following references are of record in the file of this patent:

UNITED STATES PATENTS

| Number | Name | Date |
|---|---|---|
| 1,251,246 | Landis | Dec. 25, 1917 |
| 2,131,015 | Sanford et al. | Sept. 20, 1938 |
| 2,275,944 | Breese | Mar. 10, 1942 |